United States Patent [19]

Needham

[11] Patent Number: 5,784,568
[45] Date of Patent: Jul. 21, 1998

[54] MULTI-PARTY AUDIO CHAT SYSTEM WHICH ALLOWS INDIVIDUAL USER UTTERANCES TO BE STAGED SEPARATELY TO RENDER RECEIVED UTTERANCES IN ORDER

[75] Inventor: Bradford H. Needham, Hillsboro, Oreg.

[73] Assignee: Intel Corporation, Santa Clara, Calif.

[21] Appl. No.: 522,068

[22] Filed: Aug. 31, 1995

[51] Int. Cl.$^6$ .......................... G06F 13/00; G06F 13/38
[52] U.S. Cl. ................... 395/200.64; 395/182.16; 395/330; 395/807; 370/62
[58] Field of Search ...................... 395/200.1, 807, 395/330, 182.16, 200.12, 284, 250, 200.64; 370/62, 428–429

[56] References Cited

U.S. PATENT DOCUMENTS

| | | | |
|---|---|---|---|
| 3,648,249 | 3/1972 | Goldsberry | 340/172.5 |
| 5,053,947 | 10/1991 | Heibel et al. | 364/200 |
| 5,127,001 | 6/1992 | Steagall et al. | 370/62 |
| 5,231,633 | 7/1993 | Hluchyj et al. | 370/94.1 |
| 5,261,059 | 11/1993 | Hedberg et al. | 395/325 |
| 5,293,378 | 3/1994 | Shimizu | 370/94.1 |
| 5,428,610 | 6/1995 | Davis | 370/73 |
| 5,471,586 | 11/1995 | Sefidvash et al. | 395/284 |
| 5,530,699 | 6/1996 | Kline | 370/62 |
| 5,581,566 | 12/1996 | St. John et al. | 371/376 |
| 5,664,116 | 9/1997 | Gaytan et al. | 395/200.64 |

Primary Examiner—Thomas C. Lee
Assistant Examiner—Rehana Perveen
Attorney, Agent, or Firm—Blakely, Sokoloff, Taylor & Zafman

[57] ABSTRACT

A method of communicating among participants at participant stations 1-N, the participant stations 1-N connected to a data communications network. A number of audio packet queues 1-N are assigned to each participant station 1-N. A composite audio packet is sent over the data communications network to each of the stations. The composite audio packet is comprised of an audio packet and a sending station identification (ID), the sending station ID corresponding to the station at which the composite packet originates. When the talking is done, a composite end-of-utterance marker packet is sent over the data communications network to each station. The composite end-of-utterance marker packet is comprised of an end-of-utterance marker and the sending station ID. At a receiving station, the audio packet corresponding to the sending station at which the composite packet originates is placed in an audio packet queue allocated to that sending station. The receiving station detects the composite end-of-utterance marker packet, at which time the contents of the audio packet queue are moved to a ready-to-play queue. The audio packets are played back from the ready-to-play queue.

20 Claims, 5 Drawing Sheets

MULTI-PARTY AUDIO CHAT SYSTEM WHICH ALLOWS INDIVIDUAL USER UTTERANCES TO BE STAGED SEPARATELY TO RENDER RECEIVED UTTERANCES IN ORDER

BACKGROUND OF THE INVENTION

1. Field of the Invention

The present invention is related to computers and more specifically to a computer program for allowing television-program-related, multi-person audio chats via internet-connected personal computers.

2. Prior Art

The Internet is a worldwide, on-line computer network of more than three million computers that connects governments, companies, universities, and other networks and users. The Internet began in 1984 with funding from the US government. Originally open only to government and university researchers, it is now open to anyone. The Internet and other on-line information services, such as COMPUSERVE, AMERICA ON LINE and PRODIGY, provide electronic mail, conferencing and chat services, and the ability to access remote computers for sending and retrieving files. The news media has metaphorically referred to the Internet and other on-line information services as an "information superhighway".

One of the most popular features of the Internet and on-line services is on-line chat. Chat is informal communication among users of the Internet. The chat feature allows two or more people to converse by sending text messages back and forth through a chat room accessed via the on-line service. Only those connected to the on-line service can participate in the chat, referred to as chat participants.

The Internet provides a relatively slow link between users of the network. In the Internet, information is transmitted across the network in packets which are self-contained blocks of information containing user and control data. The information is split up into individual packets, transferred across a communications link and reassembled at the receiving end. Because the network is a packet-switched, rather than circuit-switched, and because the links between computers are often heavily loaded, the delay between sender and receiver can be large, at best, several seconds.

In the face of this large delay compared to instantaneous telephone or face-to-face conversation, the social norm of speaking only during silence becomes difficult to maintain. When the receiver encounters silence, the sender may already be in the middle of composing or speaking a new sentence. The problem is compounded when attempting a multi-party conversation. Current Internet real-time audio programs do not address this problem of interrupting the speaker.

It is therefore desirable to provide a method of handling conversations over a slow medium that prevents one participant in a conversation from interrupting another participant.

SUMMARY OF THE INVENTION

Briefly, the invention is a computer software program in which a chat audio signal is queued at a receiver until a complete utterance is received. When a speaker releases a "press to talk" button, the utterance is placed into a queue of ready-to-play utterances. The ready-to-play utterances are played back in order, without mixing and in their entirety.

An advantage of this method over current methods is that since utterances are queued then played in their entirety, it is impossible to interrupt someone else; coherent multi-party conversations can be maintained in which many people speak at once.

The foregoing and other features and advantages of the invention will be apparent from the following more particular description of a preferred embodiment of the invention as illustrated in the accompanying drawings.

DESCRIPTION OF THE PREFERRED EMBODIMENT

Figure 1:
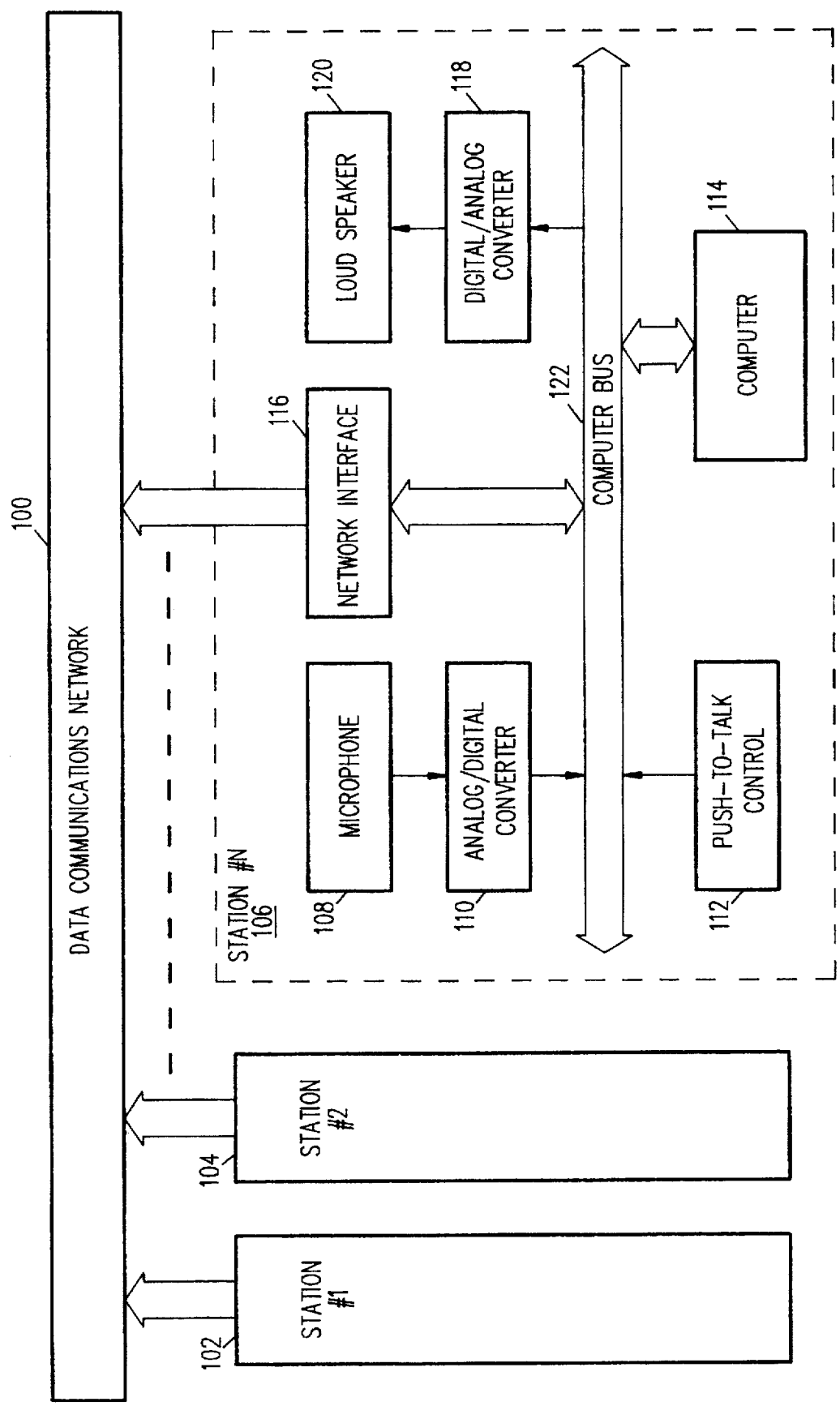
FIG. 1 is a diagram of a communication system in accordance with the present invention.

Refer to FIG. 1 which is a diagram of a communication system in accordance with the present invention. A number of stations #1, #2, ... #N (102, 104, 106) are connected to a data communications network (100). In a preferred embodiment, participants at each station communicate via their personal computers over a telephone network with an on-line service that provides Internet access. The on-line service provider transmits the conversations to each station. Each station accommodates both text and audio chat.

Configuration of Station #N

In a preferred embodiment of the invention, each station In FIG. 1 is comprised of a microphone (108) connected to an analog/digital converter (110); a push-to-talk control (112); a computer (114); a network interface (116); and a digital/analog converter (118) connected to a loud speaker (120). Analog/digital converter (110), push-to-talk control (112), computer (114), network interface (116), and digital/analog converter (118), are all connected to a common computer bus (122). The network interface is connected to the communications network (100).

Analog/digital converter (110) may be an analog-to-digital converter or an audio digitizer. Similarly, digital/analog converter (118) may be a digital/analog converter or an audio player.

The push-to-talk control (112) may be any physical control that indicates that the station's user is currently speaking. The preferred embodiment employs a graphical user interface push-button controlled by a mouse. Alternative embodiments may be, but are not limited to, a function key on a keyboard; hands-free audio processing software that determines that the person is speaking; a foot switch; voice actuated switch; or other special mechanical switch.

The network Interface (116) interfaces to the digital communications network (100) of FIG. 1. In the preferred embodiment, the network Interface is comprised of a telephone modem that connects a station to an Internet service provider. The Digital Communications Network (100) in this instance is the Internet.

In an alternative embodiment, the Network Interface (116) may be an ETHERNET card, and the Digital Communications Network may be a corporate Wide Area Network (WAN), which connects physically dispersed offices of a corporation. In another alternative embodiment, the Network Interface may be a radio modem, and the Digital Communications Network may be a radio network such as is currently used by truck dispatchers.

In the preferred embodiment Station #1 (102), Station #2 (104), etc. are personal computers. In an alternative embodiment, each station may be a special purpose computer embedded in a larger system, for example, a fighter aircraft.

Flow of Audio Data

Figure 2:
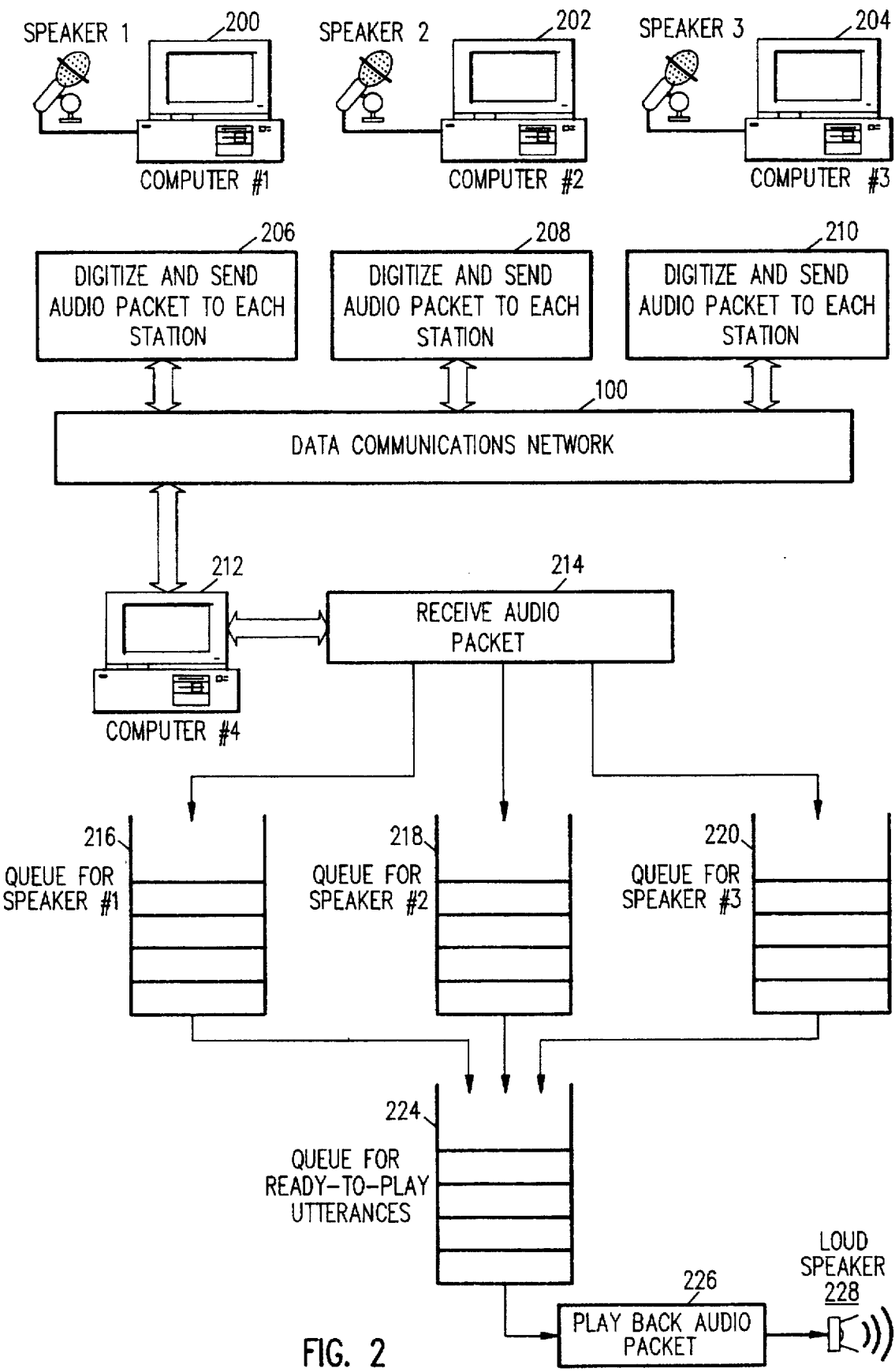
FIG. 2 is a diagram that illustrates how audio data moves through the system of FIG. 1, from microphone to loud speaker.

Refer to FIG. 2 which is a diagram that illustrates how audio data moves through the system of FIG. 1, from microphone to loud speaker. In this example, three chat participants, speaker 1, speaker 2, and speaker 3 are talking into microphones at their respective computers, computer #1, computer #2, and computer #3 (200, 202, 204). Each computer digitizes and sends an audio packet (206, 208, 210) to each other station, including a forth computer #4 (212) over the data communications network (100). Each computer receives the audio, but for illustration purposes only what happens at computer #4 will be described. The same process takes place at all other participating computers.

The audio packet is received (214) and is placed in the appropriate queue for speaker #1 (216), queue for speaker #2 (218), or queue for speaker #3 (220), depending upon the source identification (ID) that accompanies the audio packet. When an end-of-utterance packet is received at a queue, the total contents of that queue (one complete utterance) is transferred to the queue for ready-to-play utterances (224). When the queue for ready-to-play utterances (224) is not empty, play back of the audio packets takes place (226) and can be heard at the loud speaker (228). Consequently, the ready-to-play utterances are played in order, without mixing.

Transmission Process

Figure 3:
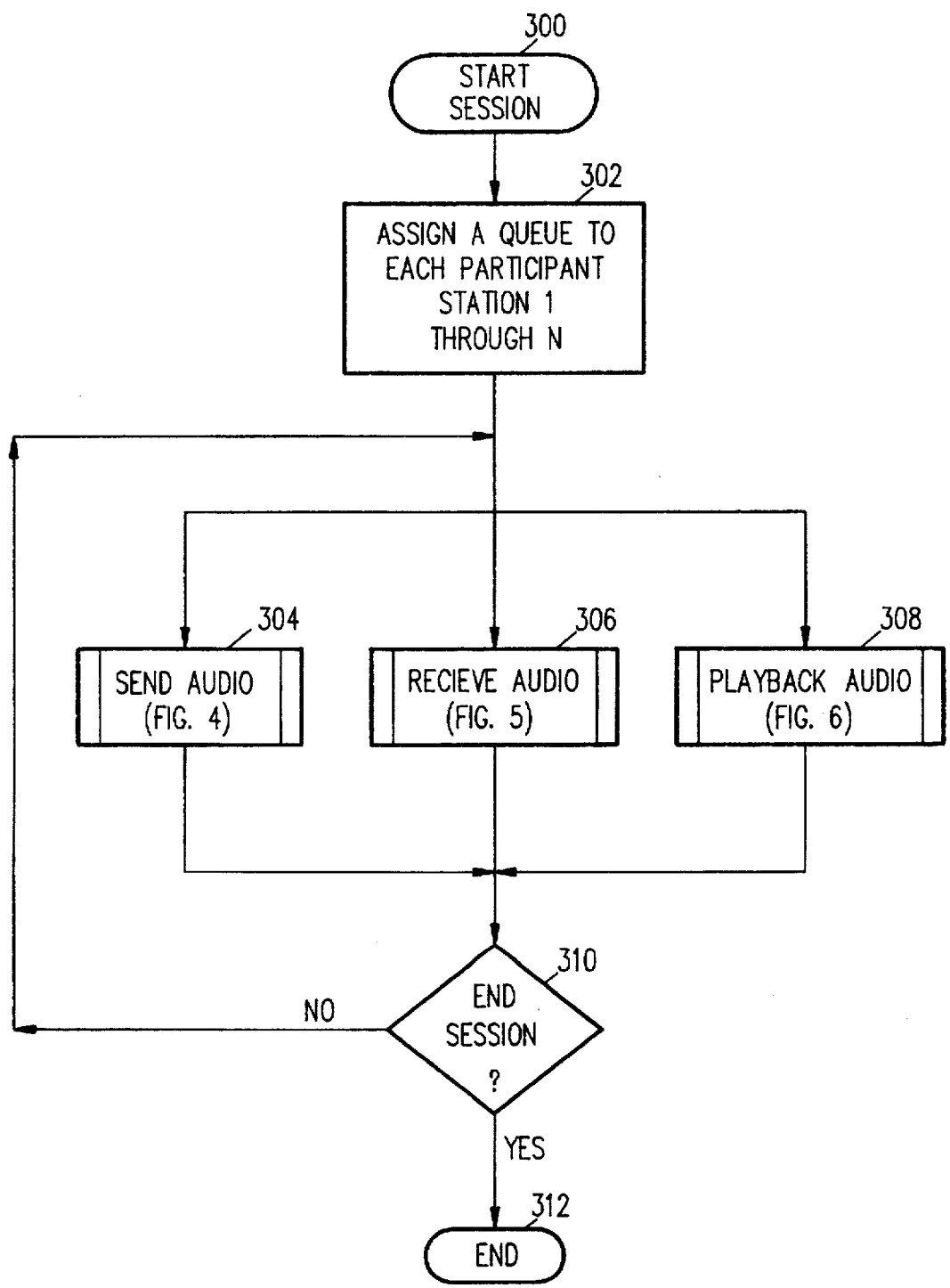
FIG. 3 is a flow chart of a method of the transmission of a chat session in accordance with the present invention.

Refer to FIG. 3 which is a flow chart of a method of the transmission, reception, and playback of an audio chat session in accordance with the present invention. A chat session starts (300) and at initialization a queue is assigned to each participant in the session at each of several participating stations 1 through N (302). Three processes act simultaneously within each station in the system: send audio (304); receive audio (306) and playback audio (308). These processes are described in detail in FIGS. 4–6, respectively. The three processes continue until an end of session is signaled (310) at which time the chat session ends (312).

Send Audio Process

Figure 4:
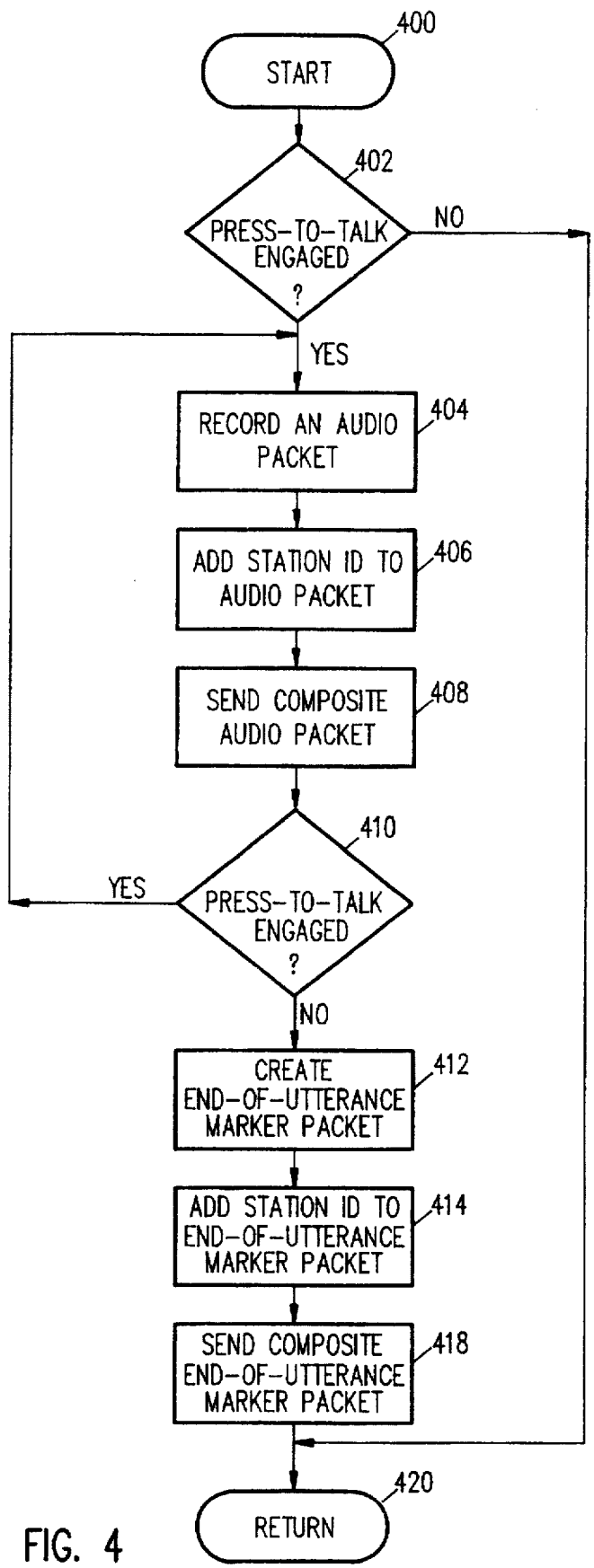
FIG. 4 is a flow chart of a method of sending audio of FIG. 3.

Refer to FIG. 4 which is a flow chart of a method of sending audio of FIG. 3. The process starts (400) and when press-to-talk is engaged (402) an audio packet is recorded (404). The station ID of the station is added to the audio packet (406) and the composite audio packet is sent (408). This process repeats until the press-to-talk is released. A soon as the press-to-talk is released (410), an end-of-utterance marker packet is created (412), the station ID is added to it (414) and the composite end-of-utterance marker packet is sent (418).

The process repeats as long as the press-to-talk is engaged (402). When press-to-talk is released (410), the process returns (420) to the flow of FIG. 3.

Receive Audio Process

Figure 6:
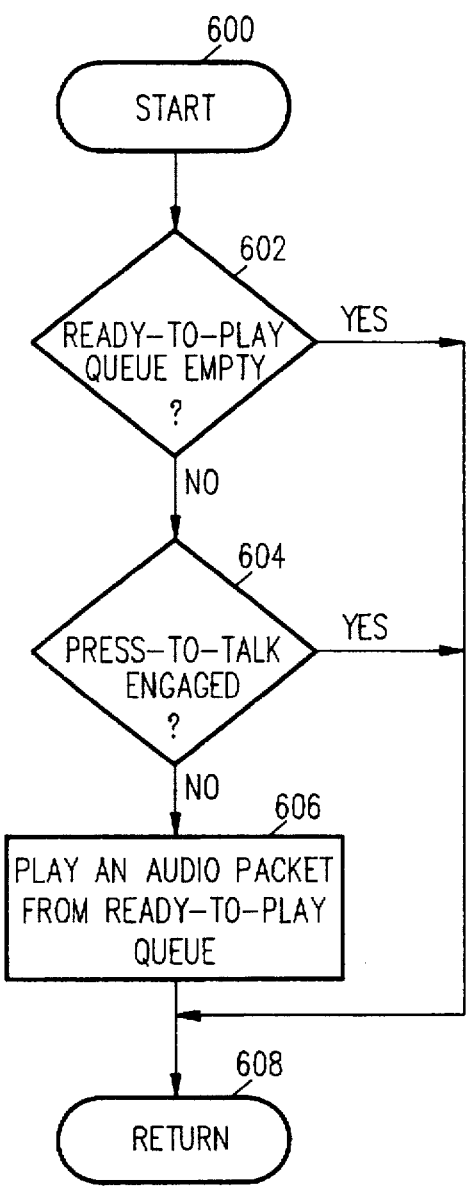
FIG. 6 is a flow chart of a method of audio playback of FIG. 3.

Refer to FIG. 6 which is a flow chart of a method of receiving audio of FIG. 3. The process starts (500), and if a composite audio packet from one of the speakers (speaker N) is received (502), the packet's station ID is detected (504). The audio packet is stored in a queue #N dedicated to the speaker #N (506) corresponding to the detected station ID. If the received packet is an end-of-utterance marker packet (508), the entire contents of the queue to which the end-of-utterance marker packet pertains is moved from the audio packet queue to the ready-to-play queue (510) and the process returns (512) to the flow of FIG. 3.

Playback Audio Process

Refer to FIG. 6 which is a flow chart of a method of audio playback of FIG. 3. If a complete utterance is in the ready-to-play queue (602) and the speaker at the receiver is not talking, that is, the press-to-talk is not engaged (604), then an audio packet is played back from the ready-to-play queue (606). If the receiver is talking, the press-to-talk is engaged (604), and the audio playback is paused until the press-to-talk button is released. After playing one audio packet from the ready-to-play queue is empty (602) the process returns (608) to the flow of FIG. 3.

SUMMARY

What has been described is a method of communicating among participants at participant stations 1-N. In FIG. 1, the participant stations 1-N (102,104,106) are connected to a data communications network (100). In FIG. 3, at each participant station a number of audio packet queues 1-N are assigned to each the participant station 1-N (302). In FIG. 4, when a press-to-talk mechanism at a sending station is engaged (402), an audio packet is recorded (404). The audio packet is combined with a station identification resulting in a composite audio packet (406). The composite audio packet is sent over the data communications network to each participant station (408).

When the press-to-talk mechanism is released (410), an end-of-utterance marker is created (412) and combined (414) with the sending station identification (ID) resulting in a composite end-of-utterance marker packet. The composite end-ofutterance marker packet is sent from the sending station over the data communications network to each of the participant stations 1-N (418).

In FIG. 6, the composite audio packet is received at a receiving station (502). The receiving station detects the audio packet's station ID (504) The receiving station stores the audio packet in a queue at the receiving station (506), the queue being specified by the station identification. The receiving station detects (504) the composite end-of-utterance marker packet corresponding to the sending station at which the composite end-of-utterance marker packet originates. The receiving station then moves the contents of queue N from the audio packet queue to a ready-to-play queue (510). In FIG. 6, the audio packet is then played back from the ready-to-play queue (606). The playing back of the audio packet from the ready-to-play queue is prevented if a press-to-talk mechanism at the receiving station is engaged (604).

While the invention has been particularly shown and described with reference to preferred embodiments thereof, it will be understood by those skilled in the art that the foregoing and other changes in form and detail may be made therein without departing from the scope of the invention.

What is claimed is:

1. Apparatus comprising:
   an interface that operates to couple the apparatus to one or more other apparatuses to facilitate a user of the apparatus to engage in a multi-party audio chat with user(s) of one or more other apparatuses;

audio mechanism coupled to the interface to facilitate said user of the apparatus to utter to the other user(s) of the multi-party chat, in a manner that allows the user's utterances to be staged by the other apparatus(es), separate from other utterances received by the other apparatuses, prior to rendering the user's utterances; and control mechanism coupled to the interface to facilitate said user of the apparatus to denote an end-of-utterance condition to the other apparatus(es) to allow the other apparatus(es) to render received utterances in order.

2. The apparatus as set forth in claim 1, wherein the user of the apparatus engages the control mechanism whenever the user utters, and disengages whenever the user stops uttering, the control mechanism denoting the end-of-utterance condition to the other apparatus(es) when the user disengages the control mechanism.

3. The apparatus as set forth in claim 2, wherein the control mechanism includes a graphical user interface icon designed to be selected by the user of the apparatus whenever the user utters, and deselected whenever the user stops uttering, the control mechanism denoting the end-of-utterance condition to the other apparatus(es) when the user deselects the icon.

4. The apparatus as set forth in claim 2, wherein the control mechanism includes a mechanical switch designed to be set by the user of the apparatus, whenever the user utters, and unset by the user whenever the user stops uttering, the control mechanism denoting the end-of-utterance condition to the other apparatus(es) when the user unsets the mechanical switch.

5. An apparatus comprising:

an interface that operates to couple the apparatus to one or more other apparatuses to facilitate a user of the apparatus to engage in a multi-party audio chat with user(s) of one or more other apparatuses;

staging mechanism coupled to the interface to facilitate separate staging of received utterances from the other user(s) of the multi-party chat; and audio mechanism coupled to the staging mechanism that renders in order completed ones the separately staged utterances.

6. The apparatus as set forth in claim 5, wherein the staging mechanism includes a first plurality of queues operate to queue audio packets received from the one or more other apparatuses, one queue for each user of the one or more apparatuses.

7. The apparatus as set forth in claim 6, wherein the staging mechanism associates and queues a received audio packet with a corresponding one of the first plurality of queues in accordance with a speaker identification included the received audio packet.

8. The apparatus as set forth in claim 6, wherein the staging mechanism further includes a second queue operates to accept and queue audio packets of completed utterances from the first plurality of queues.

9. The apparatus as set forth in claim 5, wherein when there is more than one other user associated with the multi-party chat, the audio mechanism operates to render the separately staged utterances of the other users in accordance with when the other users complete their respective utterances.

10. The apparatus as set forth in claim 5, wherein when there is more than one other user associated with the multi-party chat, the audio mechanism operates to render the separately staged utterances of the other users without mixing their respective utterances.

11. A method comprising:

(a) transmitting utterances of a participant of a multi-party chat to one or more other participants of the multi-party chat, the utterances being transmitted in a manner that allows the utterances to be staged by the other participant(s), separate from other utterances received by the other participant(s), prior to rendering the participant's utterances;

(b) transmitting an end-of-utterance indication to the other participant(s), when the participant stops uttering, to allow utterances received by the other participant(s) to be rendered in order.

12. The method of claim 11, wherein the method further comprises:

(c) communicating to an apparatus on which the method is being practice, the fact that the participant is uttering.

13. The method of claim 12, wherein (c) comprises selecting a graphical user interface icon whenever the participant utters, and deselecting the icon whenever the participant stop uttering.

14. The method of claim 12, wherein (c) comprises selecting setting a mechanical switch whenever the participant utters, and unsetting the mechanical switch whenever the participant stop uttering.

15. The method of claim 11, wherein (a) comprises transmitting the participant's utterances as audio packets, including identification information identifying the participant.

16. The method of claim 11, wherein (b) comprises transmitting an end-ofutterance packet.

17. A method comprising:

(a) receiving utterance audio packets from other participants of a multi-party chat, and separately queuing the received utterance audio packets in a plurality of queues, one queue per other participant; and (b) rendering the queued utterance audio packets in order.

18. The method of claim 17, wherein (a) further comprises receiving end-of-utterance packets from the other participants completing utterances, and moving the queued utterance audio packets of the other participants completed utterances onto a rendering queue.

19. The method of claim 17, wherein (b) comprises rendering the queued utterance audio packets in order of the other participants' respective completion of their utterances.

20. The method of claim 17, wherein (b) comprises rendering the queued utterance audio packets of the other participants without mixing queued utterance audio packets of different other participants.

* * * * *

UNITED STATES PATENT AND TRADEMARK OFFICE
CERTIFICATE OF CORRECTION

PATENT NO.   : 5,784,568
DATED        : July 21, 1998
INVENTOR(S)  : Needham

Figure 5:
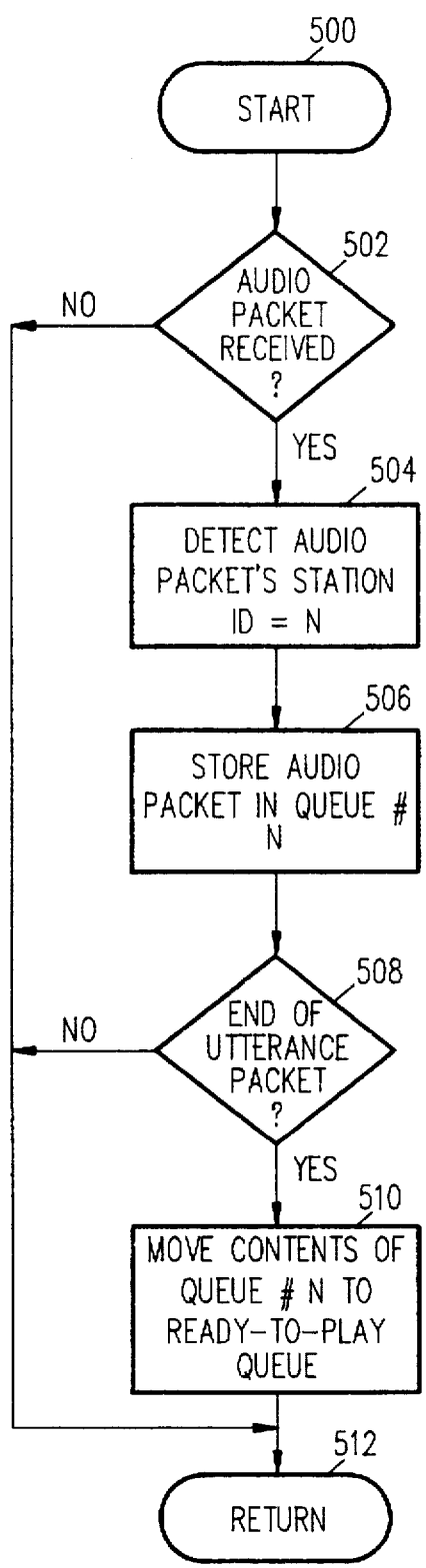
FIG. 5 is a flow chart of a method of receiving audio of FIG. 3.

It is certified that error appears in the above-identified patent and that said Letters Patent is hereby corrected as shown below:

Column 3,
Line 66, delete "FIG. 6" and insert -- FIG. 5 --.

Column 4,
Line 42, delete "FIG. 6" and insert -- FIG. 5 --.

Signed and Sealed this

Nineteenth Day of August, 2003

JAMES E. ROGAN
*Director of the United States Patent and Trademark Office*